United States Patent Office 3,641,248
Patented Feb. 8, 1972

3,641,248
IMIDAZOLE SYNERGIST-ENHANCED PHOSPHORIC ESTER INSECTICIDE COMPOSITIONS AND INSECT CONTROL THEREWITH
Heinrich Adolphi, Limburgerhoff, Pfalz, Anna Steimmig, Ludwigshafen (Rhine), and Hermann Spaenig, Limburgerhof, Pfalz, Germany, assignors to Badische Anilin- & Soda-Fabrik Aktiengesellschaft, Ludwigshafen (Rhine), Germany
No Drawing. Original application July 11, 1966, Ser. No. 563,964, now Patent No. 3,531,494, dated Sept. 29, 1970. Divided and this application Oct. 14, 1969, Ser. No. 866,362
Claims priority, application Germany, July 22, 1965, P 15 42 690.1
Int. Cl. A01n 9/36; A61k 27/00; A61l 13/00
U.S. Cl. 424—212                           8 Claims

ABSTRACT OF THE DISCLOSURE

Insecticides containing (a) pyrethrins, carbamates or phosphoric esters and (b) an imidazole or imidazole salt in the weight ratio of 1:10 to 1:1 and processes of insect control therewith.

RELATED APPLICATION

This application is a divisional application of our application Ser. No. 563,964, filed July 11, 1966, now U.S. Pat. 3,531,494, issued Sept. 29, 1970.

INTRODUCTION

The use of imidazole for controlling injurious insects has been proposed by Pence (J. Econ. Ent. 56, pages 1 to 7, 1963). Imidazole is supposed to function as antimetabolite for histamine and nicotinic acid and especially when mixed with boric acid, displays an effect on textile pests. The effect of this mixture is however only slight.

DESCRIPTION OF THE INVENTION

An object of this invention is to provide insecticidal compositions which contain prior art insecticides and imidazole derivatives, the prior art insecticides being present only in small amounts. Another object of the invention is to control insects with the said compositions.

The imidazole derivatives are those having the formula

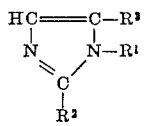

in which $R^1$ denotes a hydrogen atom or a linear or branched, saturated or unsaturated hydrocarbon chain having one to thirteen carbon atoms, i.e., linear or branched alkyl, alkenyl, or alkynyl, which may bear as substituents the following atoms or radicals: chlorine, hydroxyl, amino, diethylamino, morpholyl, alkoxy having two to thirteen carbon atoms, cyclohexoxy, phenyl and phenyl bearing as a ring substituent nitro or alkyl having one to twelve carbon atoms. $R^1$ may also denote the radical of dimethylacetal, diethylacetal, phenylmethylacetal. The latter phenyl radical may be substituted by methyl groups and/or chlorine atoms. $R^1$ may also denote the radical of propionic acid, alkylene propionates (the alkylene radical having one to four carbon atoms), or the radical of an acetylethylene ester or acetylpropylene ester. $R^2$ denotes hydrogen, the phenyl radical, an alkyl radical having one to three carbon atoms, or hydroxyalkyl with one to three carbon atoms. $R^3$ denotes a hydrogen atom, an ethyl radical, hydroxyethyl or chloroethyl. $R^1$, $R^2$ and $R^3$ are not hydrogen simultaneously. These imidazoles, or the salts of these compounds, have a marked synergistic action on pyrethrins, carbamates or phosphoric esters. The known insecticidal action of these active ingredients is considerably enhanced by the said imidazole derivatives and/or their salts.

The imidazole derivatives may be prepared by cyclization synthesis of imidazoles by prior art methods, by dehydrogenation of imidazolines or by further conversion of imidazoles, mainly by N-substitution. The N-substitution may be carried out by known methods by reaction of imidazoles or their salts with ethyl halides or esters of oxalic acid or carbonic acid or by reaction with alcohols in contact with water-eliminating catalysts. By adding imidazoles on to reactive double bonds, N-substitution products are also formed. The imidazoles may also be modified by methylolation or conversion of functional groups, for example, esterification, conversion of chlorine into amino groups or by salt formation.

For example the production of dodecylimidazolyl-acetaldehyde-O,N-acetal having the formula

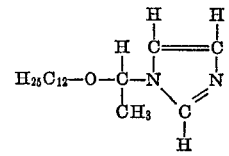

may be carried out as follows:

318 parts (by weight) of vinyl dodecyl ether, 68 parts of imidazole and 1 part of hydroquinone are heated for five hours at 180° C. while stirring.

The reaction mixture is then vacuum distilled. Dodecylimidazolylacetaldehyde - O,N - acetal distills at 171° to 174° C. at 1.7 mm. Hg in a yield of 206 parts (i.e. 73.5% of the theory).

Insecticides according to this invention may be prepared by mixing the imidazole derivatives with known insecticidal active ingredients. They may also contain conventional solid or liquid carriers and/or other active ingredients.

The salts include salts with inorganic or organic acids, for example hydrochloric acid, sulfuric acid, phosphoric acid, nitric acid, formic acid, acetic acid, trichloroacetic acid, p-toluenesulfonic acid, phenol, cresol and methylsulfuric acid.

Pyrethrins include not only unpurified or purified pyrethrum extracts but also the pyrethrins isolated from these extracts and the synthetic analogues, for example allethrin.

Carbamates include for example the α-naphthyl ester of N-methylcarbamic acid (Carbaryl), isopropoxyphenylmethyl carbamate (Propoxur) and 4-dimethylamino-3,5-xylylmethyl carbamate (Zectran).

Phosphoric esters include for example O,O-dimethyl-S-(1,2 - di - (ethoxycarbonyl) - ethyl)-phophorus dithioate (Malathion), O,O-dimethyl - S - methylcarbamoylmethylphosphorus dithioate (Dimethoate) and O,O-dimethyl-O-4-bromo - 2,5 - dichlorophenylphosphorus dithioate (Bromophos).

The imidazole derivatives and the active ingredients may be used in any relative proportions. We prefer a mixing ratio of imidazole derivative to active ingredient of 10:1 to 1:1 parts by weight.

The following table gives a selection of active compounds with their melting points (M.P.) or boiling points (B.P.) at the reduced pressure indicated:

| # | Compound | M.P./B.P. |
|---|---|---|
| 1 | 1-methyl-imidazole with $CH_2-CH_2-OH$ substituent | M.P., 58° C. |
| 2 | imidazole N-$CH_2-CH(C_2H_5)-C_4H_9$ | B.P.$_{12}$, 150° C. |
| 3 | imidazole N-$C_{12}H_{25}$ | B.P.$_{1}$, 150° to 152° C. |
| 4 | imidazole N-$C_{12}H_{25}$, 2-phenyl | B.P.$_{0.1}$, 188° C. |
| 5 | imidazole N-$C_{13}H_{27}$ | B.P.$_{4}$, 170° C. |
| 6 | imidazole N-$CH_2-CH=CH_2$, 2-$CH_2-OH$ | B.P.$_{19}$, 170° to 176° C. |
| 7 | imidazole N-$CH_2-CH=CH_2$, 2-$CH(CH_3)_2$ | B.P.$_{1}$, 66° to 69° C. |
| 8 | imidazole N-$CH_2-C\equiv CH$ | B.P.$_{0.4}$, 76° to 78° C. |
| 9 | imidazole N-$CH_2-CH_2Cl$·HCl | M.P., 128° C. |
| 10 | imidazole N-$CH_2-CH=CH-CH_2-OH$ | B.P.$_{8}$, 200° to 205° C. |
| 11 | imidazole N-$CH_2-CH_2-NH_2$ | B.P.$_{0.8}$, 98° C. |
| 12 | imidazole N-$CH_2-CH_2-N(C_2H_5)_2$ | B.P.$_{0.2}$, 90° to 92° C. |
| 13 | imidazole N-$CH_2-CH_2$-morpholino | B.P.$_{0.3}$, 131° C. |
| 14 | imidazole N-$CH_2$-phenyl | M.P., 68° C. |

TABLE—Continued

| # | Structure (N-substituent on imidazole; 2-substituent below) | Property |
|---|---|---|
| 15 | N–CH₂–C₆H₅; 2-CH₃ | B.P.₄, 140° to 141° C. |
| 16 | N–CH₂–C₆H₅; 2-CH(CH₃)₂ (CH₃–CH–CH₃) | B.P.₄, 145° to 147° C. |
| 17 | N–CH₂–C₆H₄–CH₃ | B.P.₃, 145° to 152° C. |
| 18 | N–CH₂–C₆H₄–C₄H₉ | B.P.₄, 180° to 185° C. |
| 19 | N–CH₂–C₆H₄–C₁₀H₂₁ | B.P.₄, 225° to 230° C. |
| 20 | N–CH₂–C₆H₄–C₁₂H₂₅ | B.P.₀.₄, 205° C. |
| 21 | N–CH₂–C₆H₄–CH(CH₃)(CH₂–CH₃) | B.P., 162° C. |
| 22 | N–CH₂–C₆H₄–NO₂ | M.P., 51° C. |
| 23 | N–CH(CH₃)–O–C₂H₅ | B.P.₈.₅, 95° to 97° C. |
| 24 | N–CH(CH₃)–O–C₂H₅; 2-CH₃ | B.P.₁₀, 102° C. |
| 25 | N–CH(CH₃)–O–C₂H₅; 2-CH₂–H₂OH | M.P., 95° C. |
| 26 | N–CH(CH₃)–O–CH₂–CH(CH₃)₂; 2-CH₃ | B.P.₀.₇, 85° to 88° C. |
| 27 | N–CH(CH₃)–O–C₁₂–C₁₄H₂₅–H₂₇; 2-CH₃ | B.P.₃, 161° to 169° C.¹ |
| 28 | N–CH(CH₃)–O–C₁₂–C₁₄H₂₅–H₂₇ | B.P.₂, 150° C.¹ |
| 29 | N–CH(CH₃)–O–C₆H₁₁ (cyclohexyl); 2-CH₃ | B.P.₀.₄, 101° to 108° C. |
| 30 | N–CH(CH₂Cl)–O–CH₃ | B.P.₄, 133° C. |

See footnote at end of table.

TABLE—Continued

| # | Structure | Property |
|---|---|---|
| 31 | 1-(1-chloromethyl-methoxycarbonyl)-2-isopropylimidazole | M.P., 50° C. |
| 32 | 1-(2-butoxyethyl)-2-isopropylimidazole | B.P.$_{13}$, 151° to 156° C. |
| 33 | 1-(2,2-dimethoxyethyl)imidazole | B.P.$_{0.7}$, 101° to 102° C. |
| 34 | 1-(2,2-diethoxyethyl)imidazole | B.P.$_{1}$, 110° to 112° C. |
| 35 | 1-[2-methoxy-2-(4-chloro-2-methylphenoxy)ethyl]imidazole | M.P., 60.5° C. |
| 36 | 1-[2-methoxy-2-(2,4-dimethylphenoxy)ethyl]-2-isopropylimidazole | B.P.$_{2}$, 184° C. |
| 37 | 1-(2-carboxyethyl)imidazole | M.P., 149° C. |
| 38 | 1-(methoxycarbonylethyl)imidazole | B.P.$_{4}$, 61° to 63° C. |
| 39 | 1-(methoxycarbonylethyl)-2-isopropylimidazole | B.P.$_{2}$, 128° to 130° C. |
| 40 | 1-(ethoxycarbonylethyl)-2-methylimidazole | M.P., 62° C. |
| 41 | 1-(ethoxycarbonylethyl)-2-isopropylimidazole | B.P.$_{3}$, 135° to 136° C |
| 42 | 1-(butoxycarbonylethyl)-2-isopropylimidazole | B.P.$_{3}$, 142° to 145° C. |
| 43 | 1-(2-acetoxyethyl)imidazole | B.P.$_{4}$, 146° to 149° C. |

See footnote at end of table.

TABLE—Continued

| 44 | 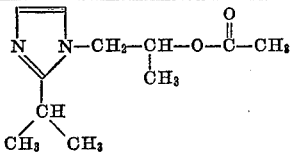 | B.P.$_{1.2}$, 122° to 124° C. |
|---|---|---|
| 45 | 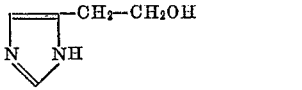 | M.P., 90° C. |
| 46 | 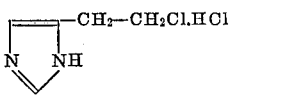 | M.P., 90° C. |

[1] Mixture.

The following known phosphoric acid esters are used for the following experiments:

| I | 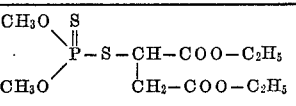 | Malathion. |
|---|---|---|
| II | 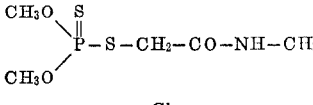 | Dimethoate. |
| III | 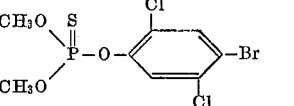 | Bromophos. |
| IV | 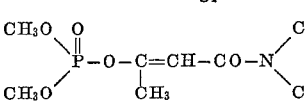 | | and the following known carbamates:

| V | 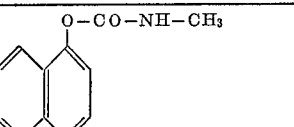 | Carbaryl. |
|---|---|---|
| VI | 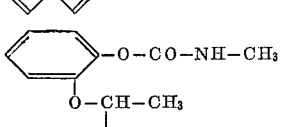 | Propoxur. |
| VII | 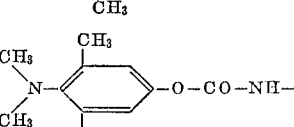 | |

The following known synergists are used as comparison substances:

| VIII | 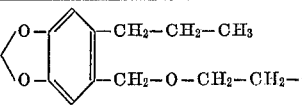 | Piperonyl butoxide. |
|---|---|---|
| IX | 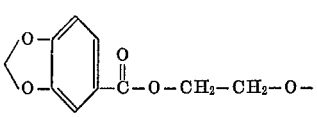 | Butyl-carbitol-piperonylate. |

The action of the above-mentioned substances is illustrated in the following examples.

EXAMPLE 1

Synergistic effect on pyrethrins

Petri dishes having a diameter of 10 cm. are wetted with an acetone solution of the active ingredient so that a coating of 0.1 mg. of pyrethrin and 1 mg. of synergist is contained in each dish. Fifty granary weevils (*Sitophilus granaria* L.) are placed in each of the dishes after the solvent has evaporated. The effect is determined after sixty minutes and stated in percentage mortality (M). 100% means that all insects are dead.

In the following table S=No. of synergist (as in the lists above); mg=amount of synergist used; M=percentage mortality; P=pyrethrin; A—10%=amount of pyrethrin which gives 10% mortality; E=effect of the mixture given as percentage mortality.

| S | Mg. | M | P | A-10%, mg. | E |
|---|---|---|---|---|---|
| 1 | 1 | 0 | Plus P | 0.1 | 93 |
| 2 | 1 | 10 | do | 0.1 | 100 |
| 3 | 1 | 8 | do | 0.1 | 100 |
| 4 | 1 | 72 | do | 0.1 | 99 |
| 5 | 1 | 1 | do | 0.1 | 100 |
| 6 | 1 | 2 | do | 0.1 | 93 |
| 8 | 1 | 6 | do | 0.1 | 91 |
| 9 | 1 | 4 | do | 0.1 | 100 |
| 10 | 1 | 0 | do | 0.1 | 100 |
| 11 | 1 | 0 | do | 0.1 | 100 |
| 12 | 1 | 2 | do | 0.1 | 100 |
| 13 | 1 | 0 | do | 0.1 | 93 |
| 14 | 1 | 14 | do | 0.1 | 100 |
| 15 | 1 | 24 | do | 0.1 | 100 |
| 16 | 1 | 14 | do | 0.1 | 93 |
| 17 | 1 | 0 | do | 0.1 | 100 |
| 18 | 1 | 8 | do | 0.1 | 100 |
| 19 | 1 | 0 | do | 0.1 | 100 |
| 20 | 1 | 2 | do | 0.1 | 94 |
| 21 | 1 | 0 | do | 0.1 | 100 |
| 23 | 1 | 10 | do | 0.1 | 100 |
| 24 | 1 | 12 | do | 0.1 | 100 |
| 25 | 1 | 10 | do | 0.1 | 94 |
| 26 | 1 | 10 | do | 0.1 | 100 |
| 27 | 1 | 6 | do | 0.1 | 100 |
| 28 | 1 | 0 | do | 0.1 | 100 |
| 29 | 1 | 0 | do | 0.1 | 98 |
| 30 | 1 |  | do | 0.1 | 100 |
| 31 | 1 |  | do | 0.1 | 100 |
| 32 | 1 | 18 | do | 0.1 | 98 |
| 33 | 1 |  | do | 0.1 | 100 |
| 34 | 1 | 0 | do | 0.1 | 100 |
| 36 | 1 |  | do | 0.1 | 95 |
| 38 | 1 | 0 | do | 0.1 | 100 |
| 39 | 1 | 18 | do | 0.1 | 100 |
| 40 | 1 | 14 | do | 0.1 | 95 |
| 41 | 1 | 4 | do | 0.1 | 100 |
| 43 | 1 | 0 | do | 0.1 | 98 |
| 45 | 1 | 8 | do | 0.1 | 100 |
| 46 | 1 | 2 | do | 0.1 | 100 |
| IX | 1 | 0 | do | 0.1 | 91 |
| Boric acid | 1 | 0 |  |  |  |
| 3 | 0.5 |  | Plus P | 0.1 | 99 |
| 5 | 0.5 |  | do | 0.1 | 100 |
| 28 | 0.5 |  | do | 0.1 | 99 |
| VIII | 0.5 |  | do | 0.1 | 90 |
| IX | 0.5 |  | do | 0.1 | 81 |
| Imidazole | 1 |  | do | 0.1 | 24 |
| Do |  |  |  |  | 0 |
| Do | 1 |  |  |  | 0 |
| Do | 1 |  | Plus boric acid | 1 | 0 |

EXAMPLE 2

Synergistic action on Allethrin
(Experimental procedure as in Example 1)

|  | Mg. |  | M |
|---|---|---|---|
| Allethrin | 0.2 |  | 30 |
| Do | 0.1 |  | 15 |
| S. 3 | 1 | Plus 0.1 mg. Allethrin | 100 |
| S. 3 | 0.5 | do | 88 |
| S. 5 | 1 | do | 97 |
| S. 5 | 0.5 | do | 73 |
| S. 16 | 1 | do | 100 |
| S. 16 | 0.5 | do | 53 |
| S. 23 | 1 | do | 97 |
| S. 24 | 1 | do | 92 |
| S. 27 | 1 | do | 88 |
| S. 28 | 1 | do | 98 |
| S. 28 | 0.5 | do | 99 |
| S. IX | 1 | do | 62 |
| S. IX | 0.5 | do | 44 |
| S. VIII | 0.5 | do | 45 |

EXAMPLE 3

Synergistic action on phosphoric esters: The procedure of Example 1 is followed; the effect is determined after two hours.

In the Table, Mal=Malathion; A–32%=amount of Malathion required to give 32% mortality.

| S | Mg. | M | Mal | A-32%, mg. | E |
|---|---|---|---|---|---|
| 3 | 1 | 8 | Plus Mal | 0.1 | 90 |
| 9 | 1 | 4 | do | 0.1 | 70 |
| 16 | 1 | 40 | do | 0.1 | 100 |
| 23 | 1 | 10 | do | 0.1 | 97 |
| 24 | 1 | 12 | do | 0.1 | 96 |
| 26 | 1 | 10 | do | 0.1 | 98 |
| 27 | 1 | 6 | do | 0.1 | 95 |
| 29 | 1 | 0 | do | 0.1 | 95 |
| 37 | 1 | 8 | do | 0.1 | 96 |
| 39 | 1 | 18 | do | 0.1 | 85 |
| 40 | 1 | 0 | do | 0.1 | 89 |
| 41 | 1 | 0 | do | 0.1 | 86 |
| 44 | 1 | 2 | do | 0.1 | 86 |
| VIII | 1 | 4 | do | 0.1 | 12 |

| S | Mg. |  |  | M |
|---|---|---|---|---|
| 3 | 0.4 | Plus 0.02 mg | IV | 74 |
| 3 |  | do | IV | 7 |
| 28 | 0.4 | do | IV | 55 |
| IX | 0.4 | do | IV | 1 |
|  | 0.4 | do | IV | 17 |
| 3 | 0.5 | Plus 0.1 mg | III | 43 |
| 3 |  | do | III | 0 |
| IX | 0.5 | do | III | 3 |
| VIII | 0.5 | do | III | 2 |
| 16 | 2 | do | II | 67 |
| 16 |  | Plus 0.2 mg | II | 5 |
| 16 | 2 |  |  | 8 |

EXAMPLE 4

Synergistic effect on pyrethrins

Houseflies in light $CO_2$ narcosis receive 1 cu. mm. of an acetone solution of the active ingredient applied to the ventral abdomen. Mortality is determined four hours later and the LD 50 (lethal dose 50%) is calculated therefrom.

In the table the calculated values are given in $\gamma$/fly for the amount of pyrethrin used in each case.

| Pyrethrin |  |  | LD 50 | 0.12, $\gamma$/fly. |
|---|---|---|---|---|
| Pyrethrin plus S | 13 | 1:8 | LD 50 | 0.071, $\gamma$/fly. |
| Do | 3 | 1:10 | LD 50 | 0.043, $\gamma$/fly. |
| Do | 21 | 1:10 | LD 50 | 0.05, $\gamma$/fly. |
| Do | 28 | 1:10 | LD 50 | 0.025, $\gamma$/fly. |
| Do | 33 | 1:10 | LD 50 | 0.079, $\gamma$/fly. |
| Do | 35 | 1:10 | LD 50 | 0.06, $\gamma$/fly. |
| Do | 36 | 1:10 | LD 50 | 0.087, $\gamma$/fly. |

By adding the synergists, the amount of pyrethrin required to kill 50% of the flies is substantially decreased. The LD 50 of the pure substances was in all cases more than 10 $\gamma$/fly and was therefore not determined more exactly.

EXAMPLE 5

Synergistic effect on carbamates

Petri dishes having a diameter of 10 cm. are wetted with an acetone solution of the active ingredient and houseflies are placed in the dishes after the solvent has evaporated. Four hours later the mortality of the flies is determined.

| | Mg. | | Mg. | M, percent |
|---|---|---|---|---|
| V | 2 | | | 0 |
| V | 0.2 | Plus S. 21 | | 1 100 |
| V | 0.1 | {Plus S. 21 | 0.1 | 1 70 |
| | | {S. 21 | 0.2 | 2 5 |
| V | 0.2 | {Plus S. 17 | 0.2 | 1 85 |
| | | {S. 17 | 0.2 | 10 |
| V | 0.2 | {Plus S. 27 | 0.2 | 60 |
| | | {S. 27 | 0.2 | 0 |
| V | 2 | {Plus S. 7 | 2 | 95 |
| | | {S. 7 | 2 | 95 |
| V | 1 | Plus S. 3 | 1 | 100 |
| V | 0.5 | {Plus S. 3 | 1 | 100 |
| | | {S. 3 | 1 | 8 |
| V | 2 | Plus S. 28 | 1 | 100 |
| V | 1 | do | 1 | 100 |
| V | 0.5 | do | 1 | 79 |
| VI | 0.01 | | | 30 |
| VI | 0.005 | Plus S. 28 | 0.025 | 85 |
| VII | 0.1 | | | 48 |
| VII | 0.1 | Plus S. 3 | 0.05 | 97 |
| VII | 0.1 | do | 0.1 | 94 |
| VII | 0.1 | do | 0.5 | 98 |
| VII | 0.1 | Plus S. 28 | 0.05 | 60 |
| VII | 0.1 | do | 0.5 | 77 |

1 Mixture. 2 Single active ingredient.

In the above tables, the Roman numerals designate the compounds earlier identified by corresponding Roman numerals.

The invention is hereby claimed as follows:

1. An insecticide composition comprising an effective insecticidal amount of (a) a phosphoric ester insecticidal active ingredient; and an amount, effective to enhance the insecticidal action of (a), or (b) an imidazole or salt thereof, said imidazole having the formula

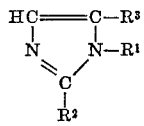

wherein $R^1$ denotes hydrogen, a linear or branched, saturated or unsaturated hydrocarbon group having one to thirteen carbon atoms, said hydrocarbon group substituted with halogen, hydroxyl, amino, diethylamino, morpholyl, alkoxy having two to thirteen carbon atoms, cyclohexoxy, phenyl, nitrophenyl, alkylphenyl with a 1–12 carbon alkyl group, the radical of dimethylacetal, diethylacetal, or phenylmethylacetal, said radical of phenylmethylacetal wherein the phenyl group bears one or more of methyl or chloro substituents, the radical or propionic acid, alkylene propionates, the alkylene radical having one to four carbon atoms, or the radical of an acetylethylene ester or acetylpropylene ester; $R^2$ denotes hydrogen, phenyl, alkyl with one to three carbon atoms, or hydroxyalkyl with one to three carbon atoms; $R^3$ denotes hydrogen, ethyl, hydroxyethyl or chloroethyl; and with the further proviso that $R^1$, $R^2$, and $R^3$ are not hydrogen simultaneously.

2. A composition as claimed in claim 1, wherein said salt of said imidazole is an acid salt and said acid is a member selected from the group consisting of hydrochloric acid, sulfuric acid, phosphoric acid, nitric acid, formic acid, acetic acid, trichloroacetic acid, p-toluenesulfonic acid, methylsulfuric acid, phenol and cresol.

3. A composition as claimed in claim 1, wherein $R^1$ denotes an alkyl, alkenyl or alkynyl group having 1 to 13 carbon atoms, $R^2$ denotes hydrogen, hydroxyalkyl with 1 to 3 carbon atoms or alkyl with 1 to 3 carbon atoms, and $R^3$ denotes hydrogen.

4. A composition as claimed in claim 1, wherein said insecticidal active ingredient is a phosphoric ester having one of the following formulae

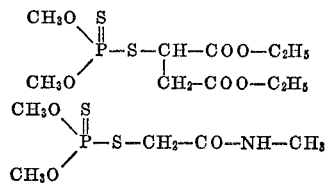

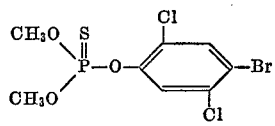

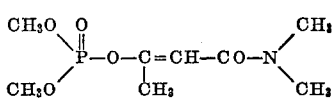

5. A composition as claimed in claim 1, wherein said imidazole or salt thereof is an imidazole having one of the following formulae

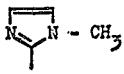

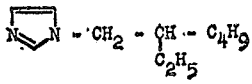

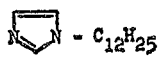

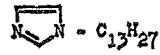

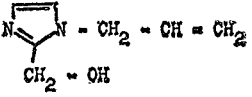

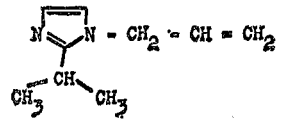

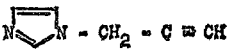

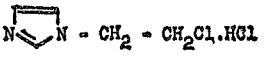

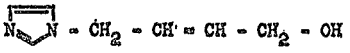

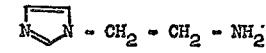

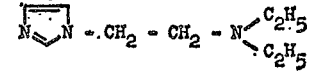

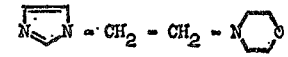

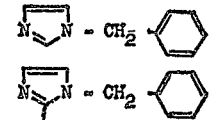

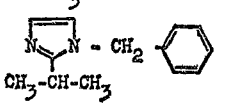

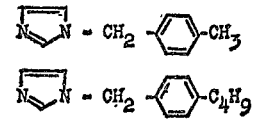

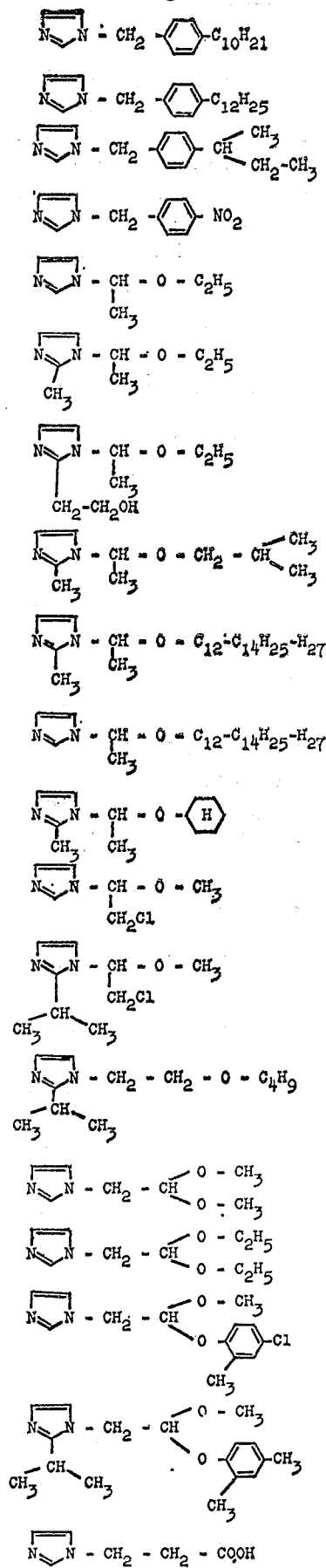

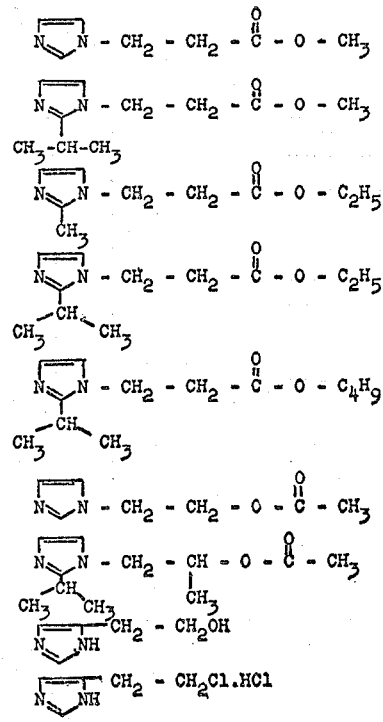

6. A composition as claimed in claim 5, wherein said insecticidal active ingredient is O,O-dimethyl-S-(1,2-di-(ethoxycarbonyl)-ethyl)-phosphorus dithioate, O,O-dimethyl-S-methylcarbamoylmethylphosphorus dithioate or O,O - dimethyl - 0 - 4 - bromo - 2,5-dichlorophenylphosphorus dithioate.

7. A process for controlling insects which comprises treating said insects on an article to be protected against insect attack with an insecticidal amount of a composition as claimed in claim 1.

8. A process as claimed in claim 7, wherein said insecticidal active ingredient is O,O-dimethyl-S-(1,2-di-(ethoxycarbonyl)-ethyl)-phosphorus dithioate, O,O-dimethyl-S-methylcarbamoylmethylphosphorus dithioate or O,O-dimethyl - 0 - 4 - bromo - 2,5 - dichlorophenylphosphorus dithioate.

References Cited

UNITED STATES PATENTS 3,396,223   8/1968   Stark _____ 424—212 X
3,531,494   9/1970   Adolphi et al. ____ 424—269 X

OTHER REFERENCES

Pence, R. J.: J. Econ. Entomol. 56: 1–7 (1963) "The Antimetabolite imidazole as a pesticide."

Pence, R. J.: Calif. AGR. 19(1): 13–15 (1965) "The Antimetabolite imidazole as a pesticide."

Ridgway, R. L. et al.: J. Econ Entomol. 59(1): 143–6 (1966) "Effect of metabolite analogs on larval development and oviposition in the boll weevil."

SHEP K. ROSE, Primary Examiner

U.S. Cl. X.R.

424—213, 225, 269

UNITED STATES PATENT OFFICE
CERTIFICATE OF CORRECTION

Patent No. 3,641,248   Dated February 8, 1972

Inventor(s) Heinrich Adolphi, Anna Steimmig, and Hermann Spaenig

It is certified that error appears in the above-identified patent and that said Letters Patent are hereby corrected as shown below:

Column 1, line 5, "Limburgerhoff" should read -- Limburgerhof --.

Column 5, in the table, number 25, that portion of the formula reading "H₂OH" should read -- $CH_2OH$ --.

Column 12, line 19, under "M", "8" should read -- 2 --.

Column 13, line 29, claim 1, "or" should read -- of --; line 46, claim 1, "or" should read -- of --.

Signed and sealed this 11th day of July 1972.

(SEAL)
Attest:

EDWARD M. FLETCHER, JR.
Attesting Officer

ROBERT GOTTSCHALK
Commissioner of Patents